United States Patent
Choi (10) Patent No.: US 6,301,375 B1
(45) Date of Patent: *Oct. 9, 2001

(54) APPARATUS AND METHOD FOR IDENTIFYING INDIVIDUALS THROUGH THEIR SUBCUTANEOUS VEIN PATTERNS AND INTEGRATED SYSTEM USING SAID APPARATUS AND METHOD

(75) Inventor: Hwan-Soo Choi, 110-901 Jungja-dong, Bundang-gu, Seongnam, Kyeongkido, 463-010 (KR)

(73) Assignees: BK Systems, Seoul; Hwan-Soo Choi, Kyeongkido, both of (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/055,330

(22) Filed: Apr. 6, 1998

(30) Foreign Application Priority Data

Apr. 14, 1997 (KR) .................................. 97-14162

(51) Int. Cl.$^7$ ...................................... G06K 9/00
(52) U.S. Cl. ............................................. 382/115
(58) Field of Search ..................... 382/115, 116, 382/117, 172, 173, 125, 124; 395/200.55; 340/825.3, 825.31, 825.34; 713/182, 186; 902/3–6

(56) References Cited

U.S. PATENT DOCUMENTS

| | | | |
|---|---|---|---|
| 4,699,149 | * 10/1987 | Rice | 600/475 |
| 4,817,183 | * 3/1989 | Sparrow | 382/125 |
| 5,787,185 | * 7/1998 | Clayden | 382/115 |
| 5,805,723 | * 9/1998 | Fujiwara | 382/172 |
| 5,887,140 | * 3/1999 | Itsumi et al. | 395/200.55 |

* cited by examiner

Primary Examiner—Joseph Mancuso
Assistant Examiner—Vikkram Bau
(74) Attorney, Agent, or Firm—Baker & McKenzie

(57) ABSTRACT

Disclosed is an optical current/voltage measurement apparatus comprised of an optical current/voltage sensor assembled in a unit and a light signal computing apparatus. The optical current/voltage sensor includes a linear polarizer for linearly polarizing the input light, some of which passes through the polarizer and some of which is diverted by 90°; a current sensor section; a voltage sensor section that is arranged perpendicular to the current sensor section with respect to the light path, and the light signal computing apparatus including a light receiver for transforming an input light signal into an electric signal; a pre-amplifier for amplifying the electric signal; a high-pass filter and a low-pass filter for separating an AC and a DC component from the amplified signal; an AC amplifier and a DC amplifier for amplifying each separated signal, respectively; a divider for obtaining the ratio of the two output signals from the amplifiers; and a main amplifier for amplifying the obtained value of the ratio to some level. The optical current/voltage measurement apparatus provides the advantages of having the capability of taking an accurate measurement of the current and voltage of a transmission line simultaneously without the influence of external disturbance or light distortion caused by bent of an optical fiber, to achieve a cost savings through the reduction of the number of expensive optical components and high voltage insulators, and to simplify carriage, set-up, and maintenance through reduction in the size of the circuit board forming the current/voltage sensor section.

11 Claims, 6 Drawing Sheets

FIG. 5C a~i: THE MARKS OF BRANCHING POINTS

FIG. 6

| THE NUMBER OF BRANCHING POINTS : 9 |||
|---|---|---|
| BRANCHING POINT | THE NUMBER OF CONNECTED BRANCHES | THE CONNECTED BRANCHING POINTS |
| a | 3 | e |
| b | 3 | c, f |
| c | 4 | b, d |
| ⋮ | ⋮ | ⋮ |
| i | 3 | e, h |

FIG. 7

APPARATUS AND METHOD FOR IDENTIFYING INDIVIDUALS THROUGH THEIR SUBCUTANEOUS VEIN PATTERNS AND INTEGRATED SYSTEM USING SAID APPARATUS AND METHOD

BACKGROUND OF THE INVENTION

1. Field of the Invention

The present invention relates to an apparatus and method for verifying the identification of individuals through their subcutaneous vein structures in the back of the hand, and more particularly, to an apparatus and method for verifying a person's identity in an access control environment which obtains a vein pattern from subcutaneous vein structures in the back of the hand, extracts vein features from the vein pattern utilizing its branching characteristics, and compares the vein features with previously stored reference features of the person. In addition, the present invention relates to an integrated system for verification of thousands of persons based on the apparatus and method.

2. Brief Description of the Prior Art

In current access control systems for security and employee management, the identity of an individual is usually verified either by a magnetic strip on a card or by an RF signal from a contactless card. Recently, a high-cost smart card with high storage capacity has been researched and developed for practical use in access control systems. Practical recognition systems using the fingerprint or face of an individual are also being developed for application to access control systems requiring high security.

These current methods of verification in access control systems have their own disadvantages as well as advantages. For example, the method using card keys or smart cards cannot prevent unauthorized persons from using the cards, and in addition, the method is costly when it is used on a large scale because so many cards are necessary. Fingerprints may not be repeatable features to particular classes of persons such as physical laborers whose fingerprints are likely to be rubbed out due to hard work over a long time. Access control systems based on face recognition are difficult to apply on a large scale because of the inconvenience in installing and operating them.

In order to alleviate the inconvenience of prior methods, an apparatus for identifying individuals through their three dimensional hand shapes was invented and filed in Korea on Apr. 14, 1997. The invention is effective and simple to use. It is, however, necessary to update the data representing the hand shape of each individual periodically because the hand shape is subject to change with time. Errors may occur in verifying the identities of individuals who have not used the apparatus for a long time. Moreover, performance of the apparatus is susceptible to small changes of the position and orientation of the hand caused by elasticity of flesh of the hand even though the hand is fixated by an arbitrary means for fixation.

SUMMARY OF THE INVENTION

The general objective of the present invention is to eliminate the problems of existing methods and to provide a novel and effective apparatus and method for verifying the identification of an individual through his vein structure, which is a unique and time-invariant biometric feature of the individual, in the back of the hand.

A more specific objective of the present invention is to provide a method of verifying the identification of an individual by processing the vein image obtained from the vein structure in the back of the hand so as to obtain discriminative features as well as efficient image processing.

Another specific objective of the present invention is to provide an integrated verification system using an apparatus which can be used effectively and efficiently for the large numbers of individuals by storing the features of each individual into a separated corresponding database which is localized according to the access authority of each individual.

We accomplish our objectives for this invention by providing an apparatus for verifying the identity of a person through the vein structure in the back of the hand comprising the following: (1) means for detecting a reflected video signal from the back of hand, (2) means for capturing a still image from the detected video signal, (3) means for extracting a vein pattern through processing of the captured image, (4) means for storing the vein features for future recall and comparison, and (5) means for comparing the extracted features with the corresponding pre-stored reference features.

Our method for verifying the identity of a person using his subcutaneous vein structure in the back of the hand comprises the following steps: (1) determining a specific area within the image of the back of hand, (2) high-pass filtering a sub-image corresponding to the specific area, (3) binarizing the high-pass filtered sub-image, (4) extracting a vein pattern from the binarized sub-image after noise elimination, (5) computing vein features from the vein pattern, (6) comparing the vein features with the corresponding reference features which is pre-stored, and (7) determining the identity or non-identity of the person according to the result of the comparison.

The first step, determining the specific area within the image of the back of hand, comprises two sub-steps, binarizing the sub-image and choosing the largest rectangular area which is inscribed to the white-pixel area corresponding to the back of hand.

Our integrated verification system comprises the following three components: (1) a number of the verifying apparatus described in the above, (2) a global storage unit for centrally storing the vein features, and (3) a communication network through which data are exchanged between the verifying apparatuses and the global storage unit, wherein each verifying apparatus can be configured so that, when necessary, the comparison can be made using the reference features downloaded from the global storage unit over the communication network.

The identity of an individual is verified through the apparatus in the following way. When the person to be identified inserts and places his hand in an appropriate position in the interior of the apparatus, the portion of incident light source which is reflected from the back of the hand is detected by the detecting means which is located over the hand. Then, the capturing means produces a stable image of the back of the hand from the detected output signal of the detecting means. A vein pattern is obtained from the captured image by the extracting means through image processing techniques, high-pass filtering and binarization. Then a vein feature representing the branching and spreading characteristics is extracted from the vein pattern and is fed to the comparing means for comparison with the corresponding reference vein pattern of the person which is pre-stored in the storing means. The identity or non-identity of the person is determined according to the result of the comparison.

For efficient identification of individuals and management of the database involving large numbers of individuals, the integrated verification system is configured so that a verifying apparatus is located at each access site and, according to the access authority of each person, the vein features for future recall and comparison is stored in a corresponding verifying apparatus or global storage unit. When the person's access is restricted to one area, his features are recorded into the local memory in the verifying apparatus. On the other hand, When a person is permitted to have access to several or all areas, the features are stored in the global storage unit and are downloaded through the communication network to the verifying apparatus being used. The downloaded feature data are used by the verifying apparatus for comparison in determining the identity or non-identity of the person.

It is to be understood that both the foregoing general description and the following detailed description are provided for exemplary and explanatory purposes only, and intended to provide a further explanation of the invention as claimed.

BRIEF DESCRIPTION OF THE DRAWINGS

The accompanying drawings, which are included to provide a further understanding of the invention, illustrate a preferred embodiment of this invention, and together with the description and serve to explain the principles of the present invention.

In the drawings.

DETAILED DESCRIPTION OF THE PREFERRED EMBODIMENTS

The configuration and operation of a preferred embodiment according to the present invention will now be explained in detail with reference to the accompanying drawings.

Figure 1:
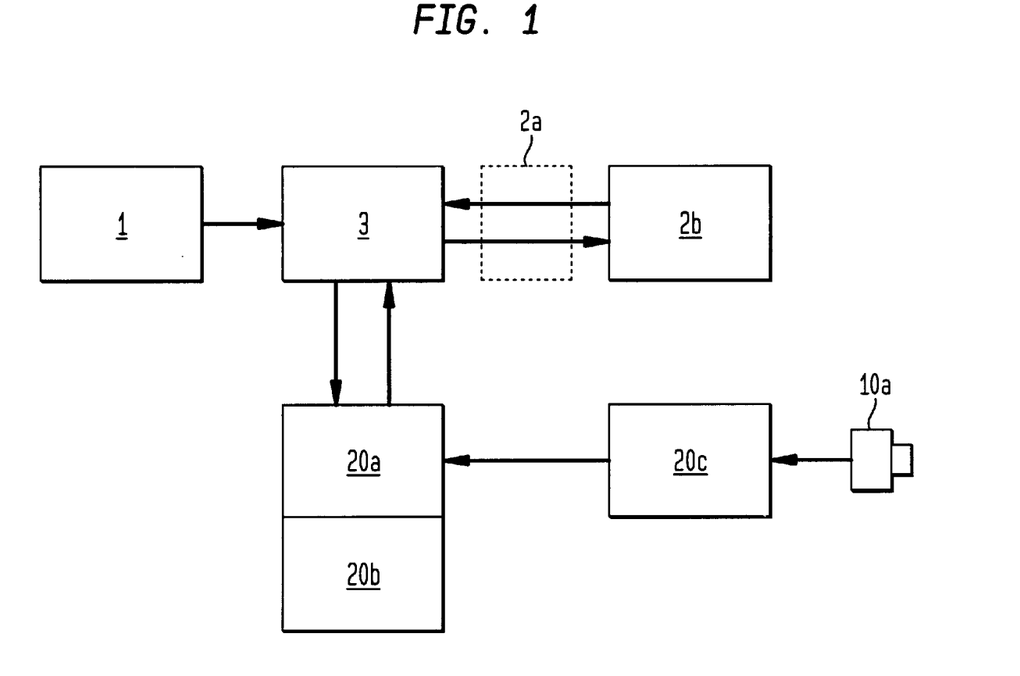
FIG. 1 is a block diagram of the apparatus of the present invention that utilizes the subcutaneous vein structure in the back of the hand for identification verification of person's identity.

FIG. 1 shows a block diagram of components located in the interior of an embodiment according to the present invention, comprising a keypad 1 with which a person inputs a personal identification number (PIN); a data memory 20b for storing persons' vein features and patterns for future recall; a CCD camera 10a which detects the portion of light source reflected from the back of hand of the person and converts it into a video signal; a frame grabber 20c for capturing a still image from the video signal from the CCD camera 10a; video memory 20a for temporarily storing the still image; microprocessor 3 which extracts a vein pattern from the temporarily stored image, extracts vein features from the vein pattern, and compares the features with the template that is previously stored in the memory 20b to determine the identity or non-identity of the person; interface module 2b through which data and control command are exchanged with external apparatuses; and interface connector 2a.

Figure 3A:
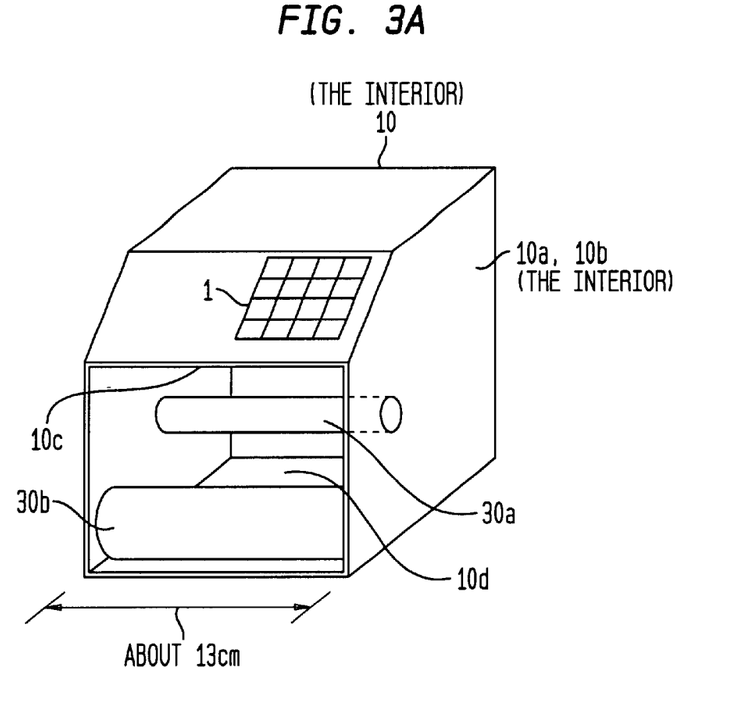
FIGS. 3A and 3B show a perspective and a side cross sectional view of the embodiment according to the present invention, respectively.
Figure 3B:
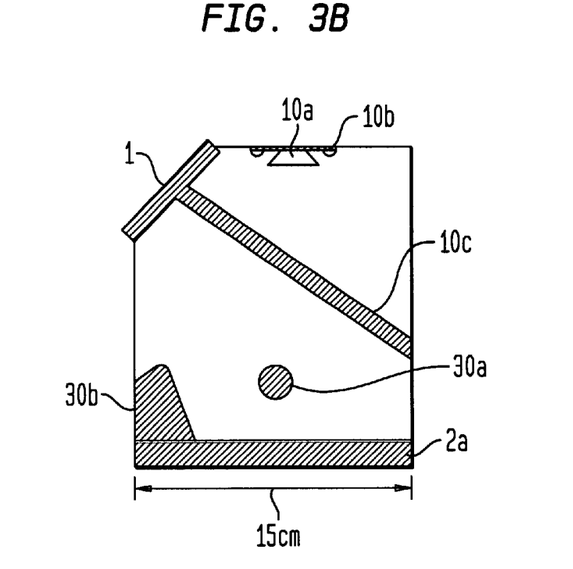

The external appearance of the embodiment according to the present invention is illustrated in FIG. 3A and 3B where a perspective and a side cross sectional view are shown, respectively. As shown in FIG. 3A and 3B, the apparatus is configured as follows: a keypad 1 for inputting the PIN is located on the frontal top of the apparatus; an interface connector 2a for connection to external devices is located in the rear of the apparatus; the interior 10 accommodates some components of FIG. 1 to be installed in the interior; a CCD camera 10a for detecting and converting the light reflected from the back of hand is located on the top of the apparatus; a near-infrared light source 10b is located on both sides of the CCD camera 10a; a near-infrared light filter 10c enables only near-infrared light to pass through; a cylindrical hand-grip bar 30a is located in the interior of the apparatus in such a manner that a person can grip the bar 30a; and a wrist pad 30b is located in front of the hand-grip bar 30a. In addition, the bottom of the interior of the apparatus, the hand-grip bar 30a, and the wrist pad 30b are all coated with near-infrared light absorbers.

Figure 2:
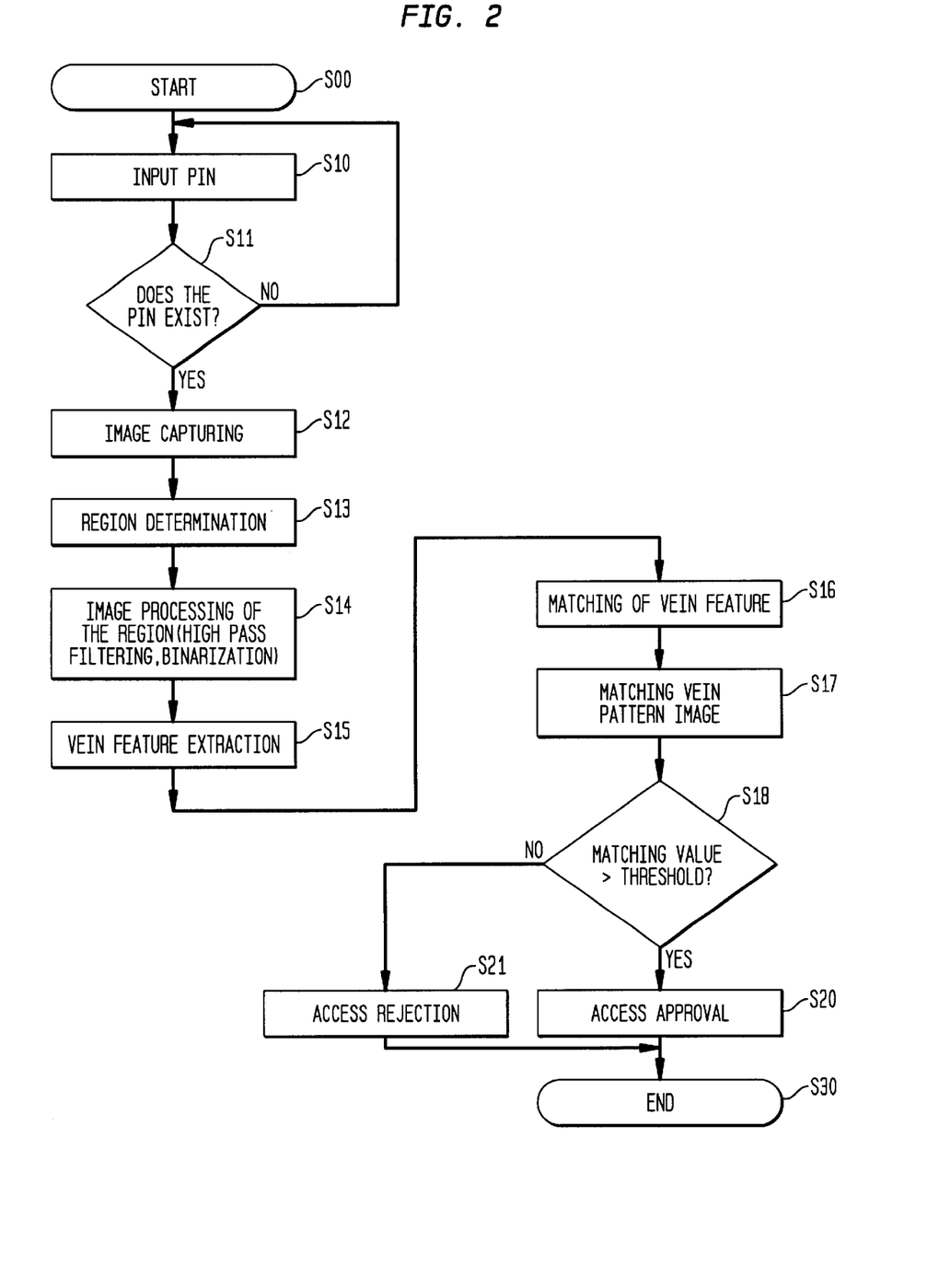
FIG. 2 is a flow chart of an algorithm for verifying the identity of an individual in the apparatus of the present invention.

FIG. 2 shows a flow chart of the method for verifying the identities of individuals through their subcutaneous vein structures in the back of the hand. The operation of the embodiment is explained in detail with reference to flows in FIG. 2.

The user activates the apparatus by inputting his PIN through the keypad 1 (step S10). Then, the user inserts his hand into the apparatus and grips the cylindrical hand-grip bar 30a with his wrist on the wrist pad 30b. A clearer subcutaneous vein structure in the back of the hand is obtained if the user grasps the bar 30a more tightly. The microprocessor 3 checks whether or not the PIN of the user exists in the memory 20b (step S11). If the PIN does not exist, control returns to the re-input stage and stays ready (step S10). Otherwise, the process starts to obtain an image of the back of hand (step S12).

The embodiment can be configured differently from the one illustrated in FIG. 3A and 3B so that the image of the back of hand is obtained from a clenched fist without the hand-grip bar 30a. In this embodiment, the interior space below the near-infrared light filter 10c is configured for forcing the user's fist to be fixated at a predetermined location so that the CCD camera 10a captures the appropriate data area on the back of hand clearly. Furthermore, contact sensor switches, such as micro switches, are located on two appropriate locations each of which is in the interior space and below the CCD camera, thereby checking whether or not the fist is positioned at a predetermined location.

Once the hand is positioned, the near-infrared light source 10b, located on the top of the apparatus, radiates near-infrared light toward the back of the hand through the near-infrared light filter 10c. The portion of near-infrared light, which is reflected from the back of the hand through the near-infrared light filter 10c, is detected by the CCD camera 10a. The other portion of the radiated near-infrared light is absorbed by the coated near-infrared light absorber. The near-infrared light filter 10c shades ambient visible light reflected from the back of the hand and incident to the CCD camera 10a, thereby reducing external disturbance and obtaining a high-quality image of the back of the hand.

Figure 4A:
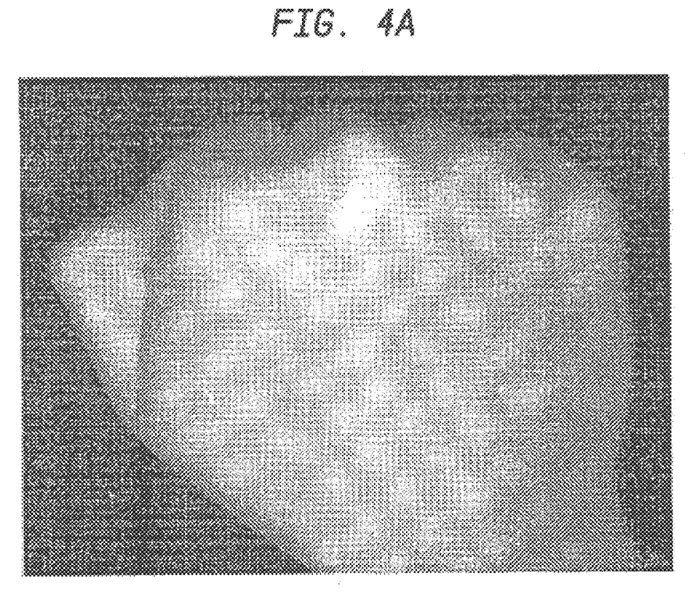
FIGS. 4A and 4B illustrate a captured image of the back of hand and a binarized image, respectively.
Figure 4B:
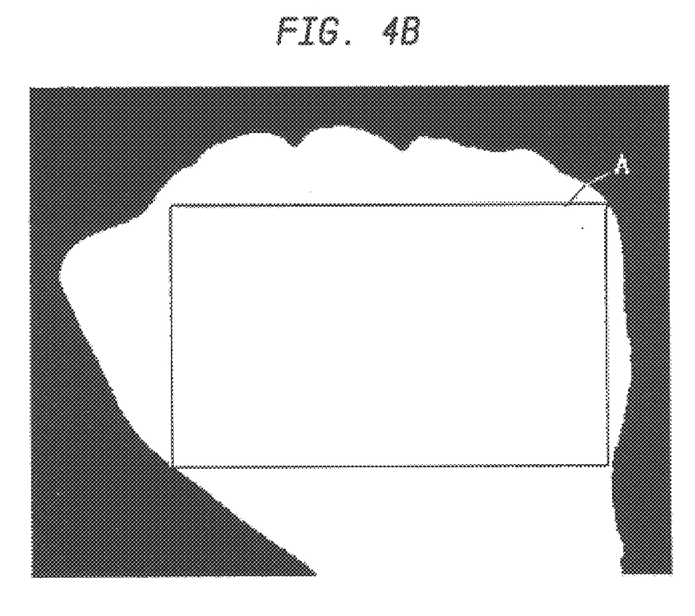

The detected light is converted into a video signal by the CCD camera 10a and then is fed to the frame grabber 20c which obtains a still image by capturing one frame of the video signal at a stable instant, as shown in FIG. 4A. The still image is temporarily stored in the video memory 20a. Keeping the still image in the video memory 20a, the microprocessor 3 performs binarization of the still image to obtain a binary, i.e., black-and-white image data as shown in FIG. 4B. Then, the largest rectangular area (denoted by 'A' in FIG. 4B) is determined which is inscribed to the white-pixel area in order to obtain as much information on the subcutaneous vein structure as possible and to achieve efficient image processing by ignoring regions outside the rectangle (step S13).

Figure 5A:
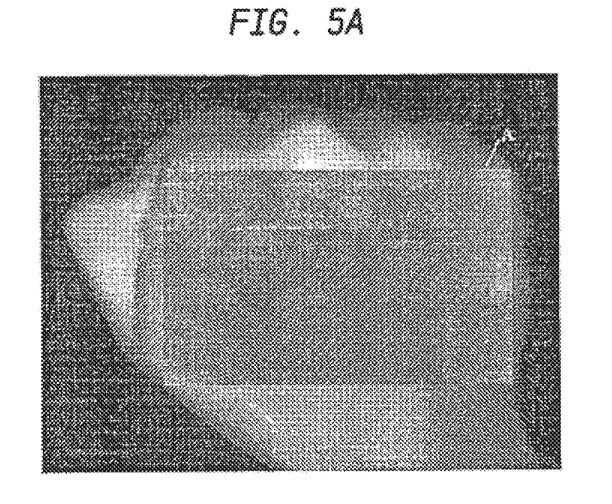
FIG. 5A illustrates an image obtained by determining a specific region in which subcutaneous vein structure is contained and then high-pass filtered.
Figure 5B:
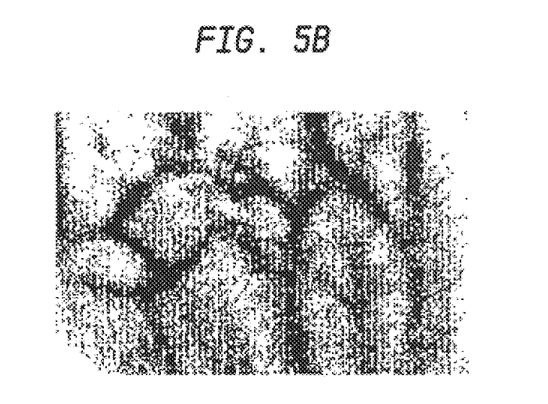
FIG. 5B illustrates a binarized image of FIG. 5A.
Figure 5C:
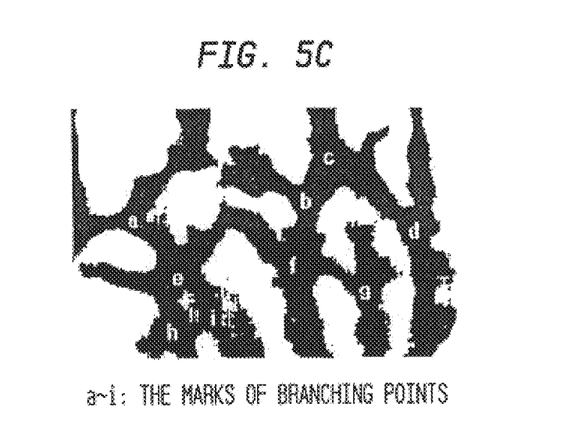
FIG. 5C illustrates a vein pattern obtained from the image of FIG. 5B after median filtering for noise reduction.

From the image stored temporarily in the video memory 20a, e.g., the image shown in FIG. 4A, a confined sub-image data corresponding to the region 'A' is extracted and is high-pass filtered so as to find regions in which abrupt change of gray pixel values occurs. The filtered sub-image is binarized by histogram-based binarization step S14). By completing the above steps, the image data shown in FIG. 5B is produced from that of FIG. 5A. After the step S14, the microprocessor 3 performs median filtering to remove irrelevant pixels around the vein patterns in the binary image (step S15). The resulting image contains only a vein pattern as shown in FIG. 5C.

Figure 6:
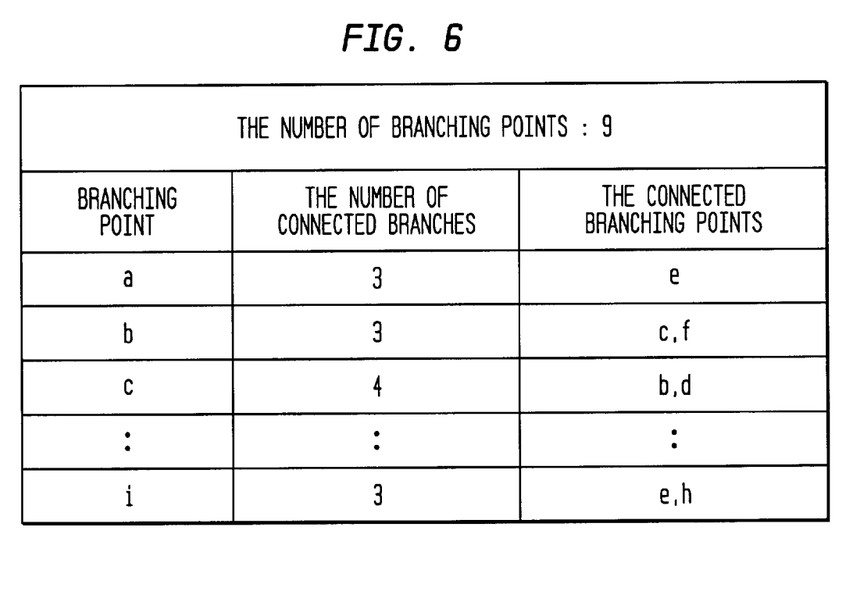
FIG. 6 illustrates a vein feature extracted from the image of FIG. 5C based on the branching characteristics.

The process for extracting vein features from the vein pattern is as follows: The microprocessor 3 computes the branching characteristics of the veins from thinning the vein pattern (step S16). The branching characteristics include branching points, the number of branches at each branching point, and the connection relationship between branching points. The vein feature of FIG. 6 is an example computed from FIG. 5C based on the branching and spreading characteristics. FIG. 6 shows that there are 9 branching points and that the branching point 'a' has 3 branches, one of which is connected to the branching point 'e' and the others are just branches which are not connected to other branching points.

Once the vein feature is computed, a comparison with the reference vein feature corresponding to the inputted PIN which is recalled from the memory 20b is made by the microprocessor 3 (step S16). In order to enhance verification accuracy, a matching between the extracted vein pattern and a reference vein pattern stored in the data memory 20b is also performed as follows (step S18). Two or more branching points from the vein feature, e.g., branching point 'a' in the upper left and branching point 'g' in the lower right in FIG. 5C, are chosen and used as reference points. Then, branching points in both of the vein patterns corresponding to the chosen reference points are superimposed in view of xy coordinate values. By making the branching points of both of the vein patterns coincide in 2-dimensional coordinates, the orientation angle difference between both of the vein patterns, which may be generated by a small twist of the wrist, can be removed. And then, correlation of the pixel value is calculated between both of the vein patterns. A decision is made as to whether or not matching indices calculated in the two steps, S16 and S18, is greater than the predetermined threshold (step S18). If both matching indices are satisfied, the identity of the individual corresponding to the PIN is verified and an access approval command is sent to a command execution unit through the interface connector 2a (step S20). Otherwise, the access of the individual is denied (step S21).

In another embodiment of the apparatus, a visible light source also can be used to extract a subcutaneous vein structure in the back of the hand if the apparatus is configured so that light incident from outside is blocked in some measure. An ultraviolet ray can also be used as a light source.

Figure 7:
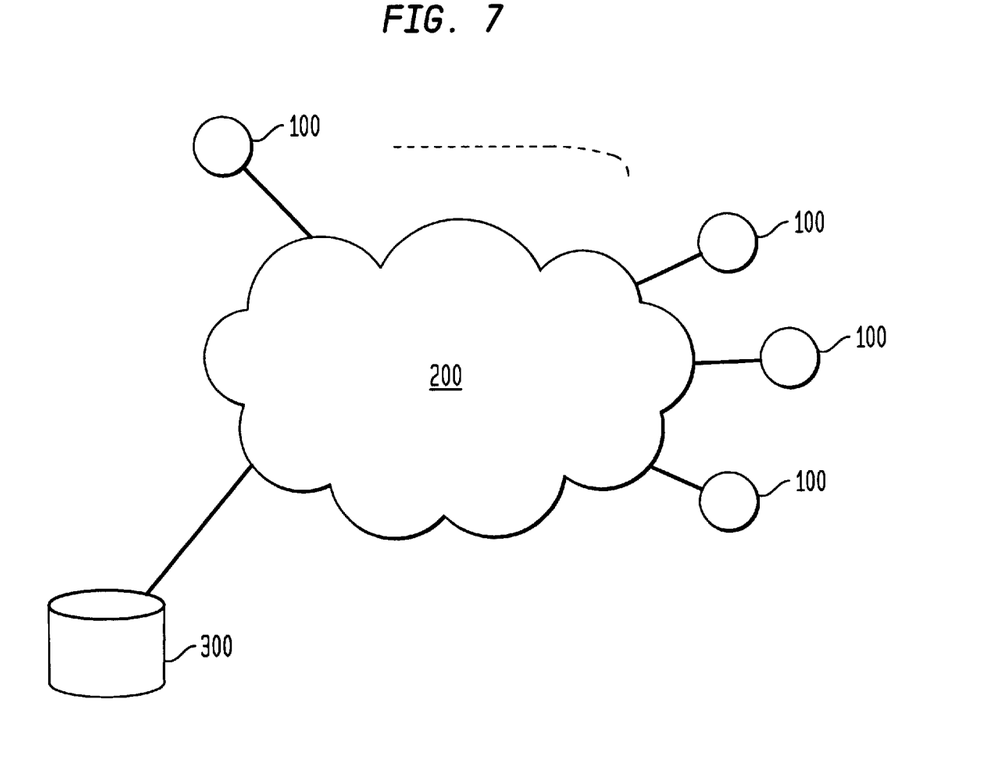
FIG. 7 is a network diagram of an embodiment of the integrated system for verifying the identities of a large number of individuals.

FIG. 7 shows an illustration of the integrated system for verifying more than thousands of persons whose working areas are localized. The integrated embodiment comprises a number of the verifying apparatus 100 which operates as described above, a global storage unit 300 for storing vein features and vein pattern images of some authorized individuals, and a communication network 200 through which data are exchanged between a plurality of the verifying apparatuses 100 and the global storage unit 300.

The integrated system according to the present invention shown in FIG. 7 is configured in the following way. The verifying apparatus 100 is located at the gateway of each area where access control is necessary, and it contains in its local storage vein patterns and vein features of individuals whose access is restricted to that area. However, the PINs of all users are stored in each verifying apparatus 100. And the global storage unit 300 has vein patterns and vein features of all individuals who have access to several or all areas.

For the operation of the integrated system according to the present invention, when a person who has access to several or all areas inputs his PIN through the keypad of the verifying apparatus 100, the verifying apparatus 100 checks whether or not the PIN exists in its local memory. If the inputted PIN is found, the verifying apparatus 100 extracts the vein pattern and vein features of the person's hand and, at the same time, requests the reference vein pattern and features corresponding to the PIN from the global storage unit 300 through the communication network 200 if multiple sites are accessible for the found PIN. Once the requested data are downloaded from the global storage unit 300, the verifying apparatus 100 compares the extracted pattern and features with the downloaded ones, and then determines the identity or non-identity of the person. If there are many individuals with multiple access areas, the above integrated system avoids inefficient usage of the local memories and manages individuals' accessibility efficiently because data needed for verification are centrally stored in the global storage unit 300. When the number of the verifying apparatuses installed is small, it is also possible to offer a direct communication path point-to-point between the global storage unit 300 and the verifying apparatuses 100 without an additional communication network.

The apparatus, method, and integrated system for verifying the identities of individuals based on their subcutaneous vein structures developed in accordance with the principles of the invention as described above can be provided with reasonably low cost hardware because the recognition algorithm is so simple that the computing load to microprocessor in completing this algorithm is low. This invention perfectly prevents unauthorized access by eliminating the possibility of the verifying medium being lost or stolen, and achieves high verification accuracy since it utilizes biometric features which are unique to each individual and not subject to change over time. Furthermore, this invention offers user-friendly interface, and if it is integrated into a network, it enables us to efficiently manage the database when large numbers of individuals are involved and to apply to various working places such as construction site.

This description has been provided only for the purpose of illustration and explanation of the preferred embodiment of the present invention; changes, variations and modifications may be made without departing from the spirit and scope of the invention.

What is claimed is:

1. A method of authenticating a user by a subcutaneous vein pattern in the back of the user's hand, comprising:

capturing an image containing a subcutaneous vein pattern from the back of a hand of a user;

extracting a plurality of branching points from the subcutaneous vein pattern of the captured image, each branching point being defined as a point where three or more vessels meet;

extracting branching characteristics for the each branching point from the subcutaneous vein pattern of the captured image, for the each branching point, the branching characteristics including the number of branches connected to the each branching point and the connection relationship between the each branching point and at least some of the other extracted branching points; and comparing the extracted branching characteristics with the branching characteristics of the branching points of a stored reference image for authentication of the user.

2. The method according to claim 1, further comprising:

aligning at least two branching points of the subcutaneous vein pattern from the captured image with the corresponding branching points of the stored reference image to align the captured image with the stored reference image.

3. The method according to claim 1, further comprising performing histogram-based binarization of the captured image.

4. The method according to claim 1, further comprising:

performing histogram-based binarization of the captured image; and median filtering the binarized image.

5. An apparatus for authenticating a user by a subcutaneous vein pattern in the back of the user's hand, comprising:

an image capturing device operable to capture an image containing a subcutaneous vein pattern from the back of a hand of a user; and a processor coupled to tee image capturing device and operable to:

extract a plurality of branching points from the subcutaneous vein pattern of the captured image, each branching point being defined as a point where three or more vessels meet;

extract branching characteristics for the each branching point from the subcutaneous vein pattern of the captured image, for the each branching point, the branching characteristics including the number of branches connected to the each branching point and the connection relationship between the each branching point and at least some of the other extracted branching points; and compare the extracted branching characteristics with the branching characteristics of the branching points of a stored reference image for authentication of the user.

6. The apparatus according to claim 5 wherein the processor is further operable to:

align at least two branching points of the subcutaneous vein pattern from the captured image with the corresponding branching points of the stored reference image to align the captured image with the stored reference image.

7. The apparatus according to claim 5 wherein the processor performs a histogram-based binarization of the captured image.

8. The apparatus according to claim 5 wherein the processor performs:

a histogram-based binarization of the captured image; and a median filtering of the binarized image.

9. The apparatus according to claim 5 wherein the image capturing device comprises:

an enclosure;

a hand grip bar attached to the enclosure;

a light source attached to the enclosure and operable to transmit light to the hand of the user; and a camera attached to the enclosure and operable to receive the light reflected from the hand.

10. The apparatus according to claim 5 wherein the image capturing device comprises:

an enclosure;

a hand grip bar attached to the enclosure;

a light source attached to the enclosure and operable to transmit light to the hand of the user;

a camera attached to the enclosure and operable to receive the light reflected from the hand; and a wrist pad attached to the enclosure and operable to rest a wrist of the user.

11. A method of authenticating a user by a subcutaneous vein pattern in the user's hand, comprising:

receiving an image containing a subcutaneous vein pattern from the hand of a user;

extracting a plurality of branching points from the received image containing the subcutaneous vein pattern, the branching point being defined as a point where three or more vessels meet;

extracting branching characteristics for each branching point from the subcutaneous vein pattern, the branching characteristics for the each branching point including the number of branches connected to the each branching point and the connection relationship between the each branching point and at least some of the other extracted branching points; and comparing the extracted branching characteristics of the branching points with the branching characteristics of the branching points of a stored reference image for authentication of the user.

* * * * *